No. 770,506.       Patented September 20, 1904.

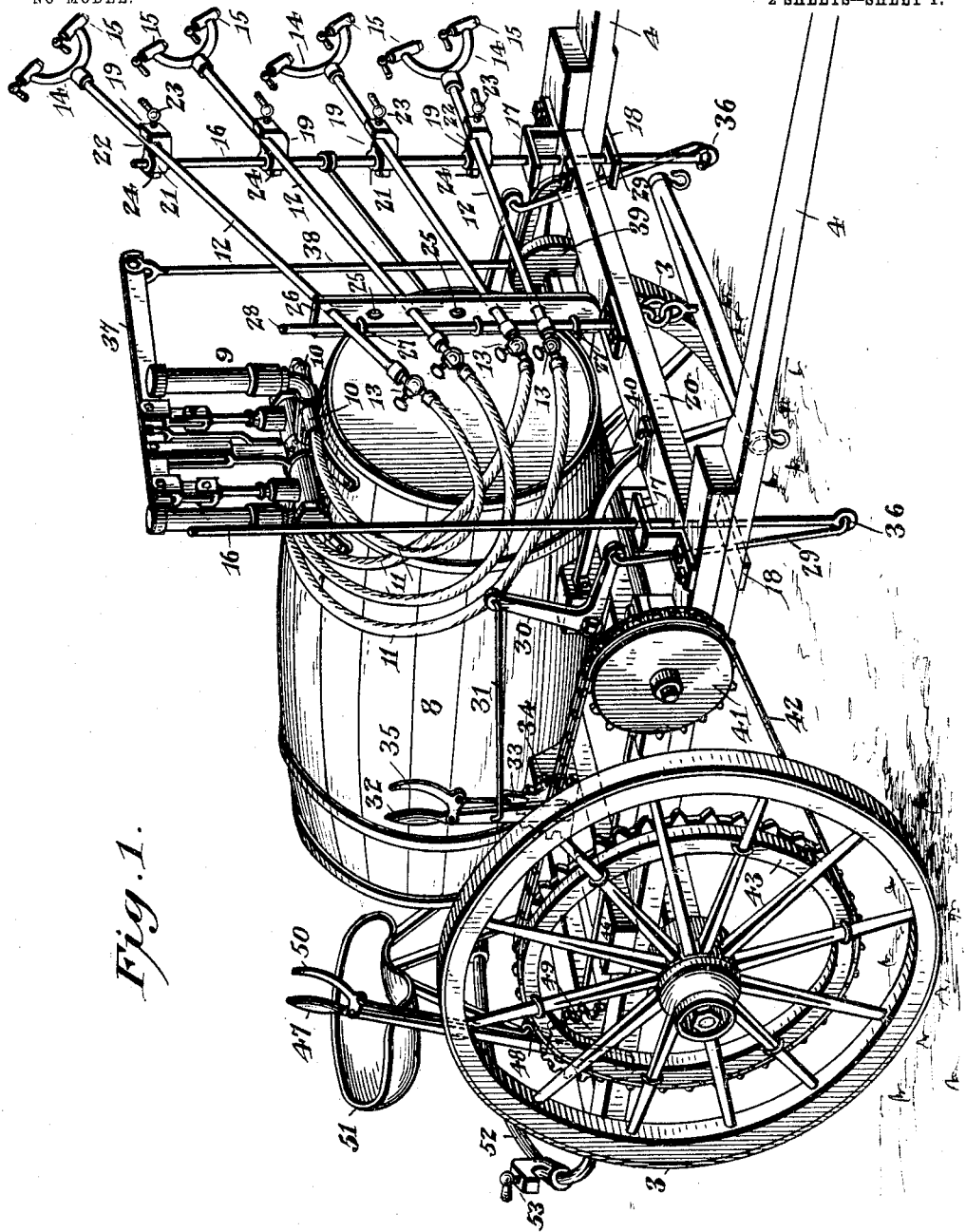

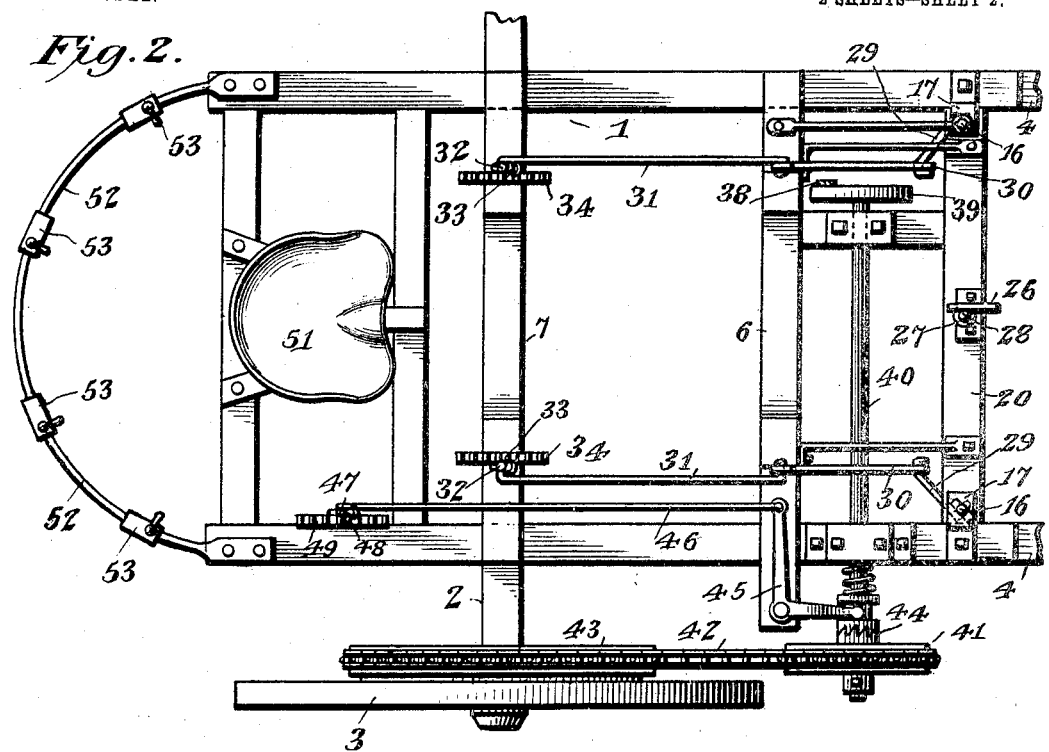

UNITED STATES PATENT OFFICE.

FELIX ALBIN PERKINS, OF PORT DOVER, CANADA.

SPRAYING APPARATUS.

SPECIFICATION forming part of Letters Patent No. 770,506, dated September 20, 1904.

Application filed January 12, 1904. Serial No. 188,714. (No model.)

*To all whom it may concern:*

Be it known that I, FELIX ALBIN PERKINS, a subject of the King of Great Britain, residing at Port Dover, in the county of Norfolk and Province of Ontario, Canada, have invented a new and useful Spraying Apparatus, of which the following is a specification.

The invention relates to improvements in spraying apparatus.

The object of the present invention is to improve the construction of spraying apparatus and to provide a simple and comparatively inexpensive one designed for spraying trees and plants and capable of enabling a plurality of spraying-nozzles to be simultaneously adjusted, whereby the water may be advantageously sprayed on trees and plants of different heights.

A further object of the invention is to enable the spraying-nozzles to be arranged at different angles and inclinations to enable them to be set for spraying trees of different heights.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a spraying apparatus constructed in accordance with this invention. Fig. 2 is a plan view of a portion of the same. Fig. 3 is a detail view of the spray-pump. Fig. 4 is a detail view of the rear portion of the frame of the apparatus, showing the clamps arranged for supporting the nozzle for spraying rows of plants.

Like numerals of reference designate corresponding parts in all the figures of the drawings.

1 designates a supporting-frame provided with an axle 2, having ground or carrying wheels 3; but the said frame, which is of general rectangular form, may be provided with a pair of axles, if desired. The vehicle formed by the supporting-frame and the wheels is in the form of a cart and is provided with shafts or thills 4. The frame is provided with centrally-arranged front and rear seats 6 and 7, which are curved to conform to the configuration of and receive a tank 8, which is in the form of a barrel, as clearly shown in Fig. 1 of the drawings. The tank may be secured to the frame of the vehicle in any desired manner, and it has mounted upon it a spray-pump 9, having a plurality of discharge-outlets 10, with which are connected flexible hose or tubing 11. The flexible hose or tubing are connected with discharge-pipes 12, having valves or cut-offs 13 at their inner ends and provided at their outer ends with arms 14. The arms, which are curved, diverge and are provided with spray-nozzles 15. The spray-nozzles, which may be of any desired construction, are preferably provided with cut-offs or valves, so that either one or both of the nozzles of each discharge-pipe may be used. The discharge-pipes are arranged one above the other and are set at an inclination, as illustrated in Fig. 1 of the drawings, to provide an area of spray, which is discharged upon trees by driving between or around the same.

The discharge-pipes are adapted to be arranged at either side of the apparatus, and the latter is provided at opposite sides with vertically-movable rods 16, mounted in suitable guides 17 and 18 and adapted to carry a plurality of clamps 19. The guides are bolted or otherwise secured to the frame at opposite sides thereof and consist of upper and lower plates. The lower plates 18 project inward from the shafts or thills, and the upper plates 17 have approximately L-shaped inner portions extending upward and inward, their inner portions being offset from the cross-bar 20, which is also pierced by the rods 16. Each clamp is provided at one end with an eye 21 and has an intermediate recess 22 to receive a discharge pipe or tube, which is clamped in the recess by a set-screw 23. The eye 21 receives the rod and the clamp and is secured at the desired adjustment thereon by means of a set-screw 24, piercing the eye at one side thereof and engaging the rod. The inner portions of the discharge-pipes are arranged in openings or seats 25 of a vertically-adjustable bar 26, arranged at the center of the front end of the frame and provided with horizontal eyes 27 to receive a guide-rod 28. The guide-rod is fixed to the frame of the apparatus, and the bar 26 is slidably and hingeably connected to the rod by the eyes 27, whereby the bar 28 is adapted to accommodate itself to movement of the discharge pipes or tubes when the same are raised and lowered by the means hereinafter described. The rods are connected by links 29 with bell-crank levers 30, fulcrumed at their angles at opposite sides of the frame and connected by rods 31 with operating-levers 32. The operating-levers 32 are fulcrumed at their lower ends and are provided with spring-actuated dogs 33 for engaging ratchets 34, whereby the discharge pipes or tubes are locked in their adjusted position. The spring-actuated dogs are controlled by latch-levers 35, mounted on the operating-levers 32 near the handles or grip portions thereof, as clearly shown in Fig. 1. The link 29 is provided at its upper end with a pivot or pintle, which pierces one of the arms of the bell-crank lever, and the lower end of the rod is provided with a pivot 36, which is arranged in an eye of the lower end of the rod 16.

The spray-pump is provided with a lever 37, which is connected by a pitman-rod 38 with a crank-disk 39 of a shaft 40. Mounted upon the shaft is a sprocket-pinion 41, which is connected by a sprocket-chain 42 with a sprocket-gear 43 of the adjacent wheel 3. The sprocket-pinion is connected to the shaft by a clutch 44, having a slidable member which is connected with a bell-crank shifting-lever 45, and the latter, which is fulcrumed at its angle, is connected by a rod 46 with an operating-lever 47. The operating-lever 47, which is located at the back of the vehicle, is provided with a spring-actuated dog or detent 48 for engaging a ratchet 49. The dog or pawl 48 is controlled by the latch-lever 50, located at the handle or grip portion of the lever.

The supporting-frame is provided at its rear end with a seat 51 for the accommodation of the driver, and the operating-levers are arranged within easy reach of the latter. The frame is provided at its rear end with a horizontally-disposed curved rod 52, which carries a series of clamps 53, constructed like those hereinbefore described and adapted to support the discharge-pipes for spraying rows of plants.

Having thus described my invention, what I claim as new, and desire to secure by Letters Patent, is—

1. In a spraying apparatus, the combination of a vehicle, a tank carried by the vehicle, a spray-pump, a vertically-slidable support mounted on the vehicle, a plurality of discharge-nozzles, means for adjustably mounting the discharge-nozzles on the support for raising and lowering them independently, and means for moving the support vertically for raising and lowering the spray-nozzles simultaneously, substantially as described.

2. In a spraying apparatus the combination of a vehicle, a tank carried by the same, a spray-pump, operating mechanism for the spray-pump driven by one of the vehicle-wheels, discharge-pipes having nozzles, flexible hose or tubing connecting the discharge-pipes with the pump, and independently-movable inner and outer supports for supporting the inner portions of the discharge-pipes and for adjusting the outer portions of the discharge-pipes, substantially as described.

3. In a spraying apparatus, the combination of a vehicle, a tank carried by the vehicle, discharge-pipes having spray-nozzles, and inner and outer substantially vertical supports located respectively at the side of the vehicle and at an intermediate point, the inner support being provided at intervals with seats, and the outer support being provided with means for holding the discharge-pipes at different elevations, substantially as described.

4. In a spraying apparatus, the combination of a vehicle, a tank carried by the vehicle, a spray-pump, spray-nozzles, lines of hose therefor connected with the spray-pump, a vertically-movable bar carried by the vehicle, means for adjusting the said bar, and means for attaching the spray-nozzle to the bar, substantially as described.

5. In a spraying apparatus, the combination of a vehicle, a tank carried by the same, a spray-pump, spray-nozzles, lines of hose therefor connected with the spray-pump, a vertically-movable bar, means for adjusting the same, and adjustable means for attaching the spray-nozzles to the bar, substantially as described.

6. In a spraying apparatus, the combination of a vehicle, a tank carried by the same, discharge-pipes having spray-nozzles and adapted to be arranged at either side of the vehicle, outer supports located at opposite sides of the vehicle and provided at intervals with means for holding the discharge-pipes, and an inner support located at an intermediate point between the outer supports and provided at intervals with seats for the discharge-pipes, substantially as described.

7. In a spraying apparatus, the combination of a vehicle, a spray-pump, spray-nozzles, lines of hose therefor, a vertically-movable bar carried by the vehicle, means for attaching the spray-nozzles to the bar, a bell-crank lever connected with the bar, an operating-lever connected with the bell-crank lever, and means for holding the bar in its adjusted position, substantially as described.

8. In a spraying apparatus, the combination of a vehicle, a tank, spray-nozzles, lines of hose therefor, vertically-movable bars located at opposite sides of the vehicle and provided with means for holding the spray-nozzles, a centrally-arranged support, and means for adjusting the vertically-movable bars, substantially as described.

9. In a spraying apparatus, the combination of a vehicle, a tank, discharge-pipes, lines of hose therefor, a centrally-arranged support receiving the inner portions of the discharge-pipes, vertically-adjustable bars located at opposite sides of the vehicle, adjustable means for securing the discharge-pipes to the bars, and means for adjusting the bars, substantially as described.

10. In a spraying apparatus, the combination of a vehicle, a tank, discharge-pipes, lines of hose therefor, a centrally-arranged rod, a movable bar connected with the rod and provided with seats for the inner portions of the discharge-pipes, and means for adjusting and supporting the outer portions of the discharge-pipes, substantially as described.

11. In a spraying apparatus, the combination of a vehicle, a tank, discharge-pipes, lines of hose therefor, a centrally-arranged rod, a movable bar connected with the rod and provided with seats for the inner portions of the discharge-pipes, and means for adjusting the outer portions of the discharge-pipes independently, and for raising and lowering the same simultaneously, substantially as described.

12. In a spraying apparatus, the combination of a vehicle provided at opposite sides with upper and lower plates having openings forming guides, vertically-movable guides mounted in the guides, bell-crank levers, links connecting the bell-crank levers with the lower ends of the rods, means for operating the bell-crank levers, spray-nozzles, and means for adjustably securing the spray-nozzles to the rods, substantially as described.

In testimony that I claim the foregoing as my own I have hereto affixed my signature in the presence of two witnesses.

FELIX ALBIN PERKINS.

Witnesses:
CLIFFORD H. A. LEES,
ARTHUR A. RALLETT.